United States Patent [19]

Kelly

[11] Patent Number: 4,978,640

[45] Date of Patent: Dec. 18, 1990

[54] DISPERSION STRENGTHENED COMPOSITE

[75] Inventor: John R. Kelly, Wellesley Hills, Mass.

[73] Assignee: Massachusetts Institute of Technology, Cambridge, Mass.

[21] Appl. No.: 159,781

[22] Filed: Feb. 24, 1988

[51] Int. Cl.$^5$ .............................................. C03C 14/00
[52] U.S. Cl. ...................................................... 501/32
[58] Field of Search ........................................... 501/32

[56] References Cited

U.S. PATENT DOCUMENTS

| | | | |
|---|---|---|---|
| 3,464,837 | 9/1969 | MacLean | 106/35 |
| 3,649,732 | 3/1972 | Brigham | 264/63 |
| 3,673,092 | 6/1972 | Dietz | 501/32 |
| 4,405,722 | 9/1983 | Kakubu et al. | 501/32 |
| 4,468,202 | 8/1984 | Cohen | 435/214 |
| 4,543,063 | 9/1985 | Cohen | 433/175 |
| 4,547,531 | 10/1985 | Waknine | 523/116 |
| 4,624,934 | 11/1986 | Kakubu et al. | 501/32 |
| 4,711,860 | 12/1987 | Gadkaree et al. | 501/32 |
| 4,755,490 | 7/1988 | DiLazzaro | 501/32 |
| 4,798,536 | 1/1989 | Katz | 501/32 |

FOREIGN PATENT DOCUMENTS

| | | |
|---|---|---|
| 189903 | 3/1982 | European Pat. Off. . |
| 048681 | 8/1986 | European Pat. Off. . |
| 0021211 | 2/1938 | Japan .................................. 501/32 |

OTHER PUBLICATIONS

Maclean et al., British Dental Journal 119:251-267 (1965).
Jones, "The Strength and Strengthening Mechanisms of Dental Ceramics," in *Dental Ceramics*, Proc. 1st Int'l Symp. Ceram., pp. 83-141 (1983).
Binns, "The Chemical and Physical Properties of Dental Porcelain," in *Dental Ceramics*, Proc. 1st Int'l Symp. Ceram; pp. 41-82 (1983).
Vines et al., J. Am. Ceram. Soc. 41(8): 304-309 (1958).
Brodbelt et al., J. Dent. Res. 59: 70-75 (1980).
Blackwood et al., Am. Ceram. Soc. Bull. 61:231-232 (1982).
Kingery et al., *Introduction to Ceramics*, pp. 368-374 (1960).
Hasselman et al., J. Am. Ceram. Soc. 49 (2): 68-72 (1966).
Lange, J. Am. Ceram. Soc. 54 (12): 614-620 (1971).
Davidge et al., J. Mat. Sci. 3:629-634 (1968).
Southan, Quintessence Int. 18: 261-263 (1987).
Jones et al., J. Oral Rehab. 2:379-396 (1975).
G. Marcos-Monte-G et al., Dental Materials, 2(5):193-197 (1986).

*Primary Examiner*—William R. Dixon, Jr.
*Assistant Examiner*—David M. Brunsman
*Attorney, Agent, or Firm*—Fish & Richardson

[57] ABSTRACT

A dispersion-strengthened composite that includes a glass matrix reinforced with submicron-sized filler particles not crystallized from the matrix and the use of colloidal processing techniques to prepare such composites and unfilled glass materials as well.

21 Claims, No Drawings

DISPERSION STRENGTHENED COMPOSITE

BACKGROUND OF THE INVENTION

This invention relates to processing glass and dispersion-strengthened glass materials.

Dispersion-strengthened composites are materials in which crystalline reinforcement particles, e.g., alumina or zirconia, are dispersed throughout a glass matrix, e.g., a feldspathic glass. The crystalline particles improve the elastic modulus, strength, and toughness of the glass; the degree of improvement is related to the volume fraction and particle size of reinforcement added. The size of the reinforcement particles typically is on the order of 10–50 $\mu$m.

Maclean et al., British Dental Journal, 119: 251-67 (1965) has suggested using alumina-filled porcelain composites of this type to form dental prostheses, e.g., crowns. In dental laboratory practice, composites generally are prepared by first forming an aqueous slurry of the glass and reinforcement powders. The slurry is then stacked on a substrate and vibrationally compacted. The compacted article (called "Greenware") is then fired to form the final composite.

SUMMARY OF THE INVENTION

In general, the invention features in a first aspect a dispersion-strengthened composite that includes a glass matrix reinforced with submicron-sized filler particles not crystallized from the matrix.

In preferred embodiments, the matrix is a glass-forming oxide, e.g., an aluminosilicate such as feldspar. Preferably, the matrix is prepared from a glass-forming powder having a mean particle size less than 10 $\mu$m. Even more preferred are narrow size distribution and classified glass-forming powders having a mean particle size between 0.1 and 10 $\mu$m, inclusive. The narrow size distribution powders have a coefficient of variation of less than, e.g., 100%, while the classified powders have a coefficient of variation of less than, e.g., 50%.

The filler may be amorphous or, more preferably, crystalline. Examples of suitable fillers incude silica (fumed or in the form of quartz), alumina, mullite, zirconia, and leucite, $\beta$-cordierite, or a combination thereof, with alumina being the most preferred. The mean particle size of the filler preferably is outside the wavelength range of white light (e.g., outside the range of about 0.3–0.7 $\mu$m) where it is desired to maximize translucency. Translucency is also enhanced by using a narrow size distribution or classified filler having a mean particle size between 0.1 and 0.7 $\mu$m, inclusive, or a monodisperse filler (i.e., having a coefficient of variation of less than, e.g., 10%) having a mean particle size within this range, because the use of such fillers decreases light scattering that results in opaque composites. The volume fraction of filler in the composite preferably is between 0.05 and 0.95, inclusive, more preferably between 0.10 and 0.60, inclusive.

The composite is preferably sintered to form a dense article. The sintered composite is translucent, the light transmission through a 1 mm thickness preferably being at least 10%. The density of the sintered composite preferably is at least 90% of the theoretical density (as measured by Archimedes' method), while the fracture strength (as measured by a four point modulus of rupture) preferably is at least 15,000 psi.

The composite is particularly useful as a dental prosthesis, e.g., a crown or bridge, or as a dental restoration, e.g., inlay or onlay. The composite can also be provided in the form of a machinable block.

The composite is prepared using colloidal processing, which permits very small particles to be used. First, an admixture of a glass-forming powder and filler particles (preferably submicron particles or particles having a mean particle size between 10 and 40 $\mu$m, inclusive) is formed, which is then colloidally processed to form a stabilized dispersion (i.e. a dispersion that resists agglomeration). The dispersion is then consolidated to form the composite. Preferably, the admixture or the consolidated dispersion is heat-treated to remove any volatile components, e.g., $H_2O$, $CO_2$, and $CH_x$, that could lead to porosity during sintering, and then sintered following consolidation to form a dense article.

The invention also features a glass prepared by colloidally processing a glass-forming powder (preferably having a mean particle size less than 10 $\mu$m, more preferably a narrow size distribution or classified powder having a mean particle size between 0.1 and 10 $\mu$m, inclusive) to form a stabilized dispersion, and then consolidating the dispersion to form the glass. Like the composites described above, the powder or consolidated dispersion can be heat-treated to remove volatiles and then sintered. Following sintering, the glass can then be hot isostatically pressed. The glasses are also useful in dental prostheses or restorations, and can be provided as machinable blocks.

The invention also features a stabilized dispersion that includes a colloidally processed glass-forming powder preferably having a mean particle size less than 10 $\mu$m. Preferably, the dispersion further includes submicron-sized filler particles admixed with the powder.

The invention provides strong, fracture-resistant, translucent glasses and reinforced glass composites. These materials exhibit fewer and smaller defects, thereby improving machinability, and reduced porosity due to the use of finer particles, colloidal processing, and the heat treatment step. Furthermore, the size of fatal flaws in the finished article is limited, thereby increasing the fracture strength and decreasing the probability for failure at a given stress. The use of fine powders enables dense articles to be prepared faster and at lower sintering temperatures because these two factors scale with particle size.

By using very small crystalline filler particles, it is not necessary to match the coefficients of thermal expansion for the matrix and filler because thermal stress cracking due to different thermal expansion characteristics of matrix and filler is minimized for small filler particles. This permits a wider choice of suitable matrix-filler combinations. For example, matrix-filler combinations which are closely matched in refractive index may be used even though they may not be closely matched in coefficient of thermal expansion. Moreover, the use of submicron filler particles whose size is outside the wavelength range of white light results in strengthening while minimizing any concurrent increase in opacity. This permits larger amounts of filler to be added, resulting in higher strengths since the strengthening effect of the filler is related to its volume fraction in the composite. The ability to maintain some translucency even at high filler content makes the composites particularly useful for dental prostheses and restorations where, for esthetic reasons, it is desireable to match the translucency of natural teeth.

DESCRIPTION OF THE PREFERRED EMBODIMENTS

We now describe preferred embodiments of the invention.

The invention features both unfilled glasses and filler-reinforced glass composites. In the filled glass composites, the choice of filler and matrix is dictated by the end use of the composite. However, because it is not necessary to match the coefficients of thermal expansion for the matrix and filler a wide range of combinations is available. For example, in the case of a dental prosthesis such as a crown, it is important to maximize translucency in order to match the optical characteristics of surrounding teeth for a natural effect. Thus, fillers and matrices having closely matched indices of refraction are desired. Furthermore, because light scattering (and therefore opacity) is maximized when the particle size of the filler matches that of white light (about 0.3–0.7 $\mu$m), it is desirable to choose filler particles outside the white light wavelength range. Thus, filler particles below about 0.3 $\mu$m or above 0.7 $\mu$m (e.g., between 10 and 40 $\mu$m) are selected; filler particles above 40 $\mu$m are generally not desirable because they tend to weaken the composite.

On the other hand, if translucency is not an important factor but high strength is, fillers and matrices having high moduli of elasticity but mismatched indices of refraction may be used. The volume fraction of filler in the composite will also be affected by the end use, with higher filler volume fractions being used where high strength is required.

If a colored composite is desired, colorant fillers may be added.

The glasses and reinforced glass composites are prepared using colloidal processing. Colloidal processing is a technique for processing powder dispersions in which the dispersion is a stabilized, non-agglomerated suspension of particles in aqueous or non-aqueous solvents. It involves forming a suspension of a fine powder (e.g., a powder that has been previously ball-milled or a chemically synthesized glass-forming powder) consisting of a glass-forming powder (and filler particles in the case of a composite), and then creating a stable dispersion by treating the particles so that they repel each other and remain apart. This is accomplished either by controlling the surface charge on the particles or by creating steric interference between the particles by adsorbing or binding molecules to the particle surface. This in turn is achieved by controlling the pH of the suspension or adding a dispersant, e.g., an organic polymer. The goal of colloidal processing is to prepare homogeneous greenware (i.e., the consolidated but unfired glass or composite) by eliminating large defective particles and voids that form from particle agglomeration. Preferably, the glass-forming powder (and filler in the case of a composite) is heat-treated prior to colloidal processing to eliminate volatiles that can lead to pore formation.

The stable dispersion is consolidated to form greenware by filter-pressing, filter-casting, centrifugal casting, or other techniques to remove excess suspending liquid. The greenware can be formed into its near-final shape and then fired (sintered) to form a densified article. This article can then be hot isostatically pressed to form the finished product. The greenware can also be formed initially into a block which is then fired and machined to form the desired article. In the case of dental prostheses such as crowns, the dispersion preferably is introduced into a mold made in part from an impression or optical image of the patient's mouth, and then consolidated and fired.

Specific composites were prepared as follows.

EXAMPLE 1

This example describes the preparation of an alumina-filled feldspar composite using the procedure described in Moffatt, U.S. Ser. No. 000,208 entitled "Ceramic Composite Production by Precipitation of Polymer Solution," filed Dec. 30, 1986, assigned to the same assignee as the present application, hereby incorporated by reference (copy attached).

Natural potassium feldspar was ground and then ball-milled in an aqueous solution of deionized water (DIW) adjusted to pH 5.5–8.5 with nitric acid/ammonium hydroxide. Milled powder was produced, in suspension, in a unimodal size distribution centered around 1.0 micron. Nitric acid/ammonium hydroxide was again used to adjust the solution to pH 5.5–8.5 and larger particles allowed to settle. Remaining dispersed particles were decanted, leaving larger particles and particle agglomerates behind. This separation step narrowed the particle size distribution and slightly shifted the mean particle size to a smaller value.

Chemically precipitated alumina particles with a unimodal size distribution centered around 0.06 micron were dispersed in DIW with pH adjusted to 1.5–2.5 with nitric acid. Large agglomerates were allowed to settle and the remaining dispersion decanted as above.

These alumina and feldspar dispersions were mixed in ratios to yield 5, 10, 20, 30, 40, and 50 weight-percent alumina. The alumina dispersion was added dropwise to the feldspar dispersion to allow coating of the feldspar particles with alumina. A solution of 0.33 weight percent poly(vinyl alcohol) (PVA) in DIW was added to the alumina-feldspar dispersion in a ratio of 300 ml PVA solution per 30 grams of powder. This PVA-containing dispersion was allowed to equilibrate for 30 minutes to allow for distribution of the PVA between powder surfaces and solution. Acetone was then added to the PVA-mixed powder dispersion in a ratio of 1.25 ml acetone per 1.0 ml dispersion. Acetone, being a non-solvent for PVA, precipitated the PVA from solution and along with it the formerly dispersed powders (this process being defined as coacervation).

The alumina-feldspar coacervate was filter-pressed in a cylindrical press (1.5 inch diam.) with porous metal frits at either end. Filter material (0.2 micron) covered the powder-contacting surface of each metal frit. Pressure (10,000 pound load) was applied to the press-powder assembly for 20 minutes to consolidate the powder creating a greenware having 40–60 percent theoretical density with an extremely homogeneous distribution of the alumina and feldspar particles.

The greenware was dried in air at 80° C. for 8–12 hours and then fired at 2° C./minute to 1100°–1200° C. with a 1 hour hold at 600° C. for burn-out of residual organic and volatile inorganic material and a 0–2 hour hold at the maximum firing temperature depending upon the weight percent of filler used. The sintered composite was then cooled to room temperature at 25° C./minute.

Physical properties of the composites prepared as described above were significantly better than those made from traditionally sized and processed powders. These composites had (1) a modulus of rupture increased two times, (2) a reliability (Weibull modulus) increased three times, and (3) a translucency that was improved relative to traditionally sized and processed powders. The polishability of the composites was also improved.

An unfilled feldspathic glass was also prepared using the above-described procedure, as well as an alumina-filled feldspathic glass using centrifugally classified alumina.

EXAMPLE 2

The procedure in Example 1 was repeated except that the starting powder was given a decomposition heat treatment to eliminate, or significantly reduce, the formation of gaseous pore-producing decomposition products during sintering of the glass and filled glass composite. This heat treatment enabled the unfilled glass and the composite to be fired under high vacuum for extended times, thereby allowing sintering to proceed to a significantly increased density.

The heat treatment involved heating the starting glass powder, or coacervated or other homogeneous mixture of glass and filler powder, to 750°–1400° C. at 15° C./minute with a hold at maximum temperature of 30 minutes to 8 hours. The resulting bubble-filled product was then re-ground and comminuted to a size range specified in Example 1 and processed accordingly.

If colorant fillers are added, the heat treatment can be performed in an atmosphere designed to control oxygen partial pressures so that the colorants maintain their appropriate oxidation state, and thus the proper color. An example of such an atmosphere is a mixture of water vapor in hydrogen gas.

The consolidated greenware can also be heat-treated. In this case, the treated product is fired directly without regrinding.

EXAMPLE 3

This example describes a process for preparing greenware having complex or custom-designed shapes.

The coacervated unfilled glass and glass-filled composite powders prepared as in Examples 1 or 2 were filter-pressed into a porous mold (e.g., a gypsum, silicate, or phosphate-bonded investment mold) contained within a stainless steel flask. The internal surface of the mold contained a thin coating of an alginate separating medium. Filter-pressing was carried out as in Example 1, with the porous mold acting in place of the metal frits. Following drying, the mold material was broken away from the dried greenware to yield the consolidated article which was then sintered as in Example 1.

For dental prostheses, the internal dimensions of the greenware are maintained during sintering by filling the internal portion of the greenware with an appropriate refractory die material, as is done in conventional dental laboratory practice.

EXAMPLE 4

The procedures of Examples 1, 2, or 3 are followed except that a dispersant-solvent combination other than PVA-water is used for colloidal processing. Examples of suitable combinations are shown in Table 1 below.

TABLE 1

Examples of dispersant-solvent combinations suitable for colloidally processing glass/filled glass powders.

| Dispersant | Solvent |
|---|---|
| poly(acrylic acid), 0.1–0.5 wt % | water |
| poly(ethyleneimine), 3.0–5.0 wt % | water |
| hydroxypropylcellulose, 0.1–1.0 wt % | isopropanol |
| hydroxymethylcellulose, 0.1–1.0 wt % | isopropanol |
| Darvan-C ®, 0.1–0.5 wt % | water |
| Collodion ®, 2.0–5.0 wt % | isopropanol |

EXAMPLE 5

The procedure of Examples 1, 2, 3, or 4 is followed except that a higher index of refraction glass is used in place of feldspar in order to more closely match the index of refraction of the alumina filler particles and thereby achieve a more translucent composite. Examples of such glass compositions appropriate for alumina are given in Table 2 below. In this example, the size range of the filler particles may be larger than a unimodal distribution centered around or below 0.06 micron due to the closer match in refractive index. A close match betwen the index of refraction of the filler particles and the matrix minimizes te requirement to use filler particles which are outside the wavelength range of white light in order to achieve a translucent composite.

A titania aluminosilicate composite (61.5 weight % Si, 28.8 weight % Ti, 1.5 weight % Al) in which the index of refraction of the glass was intermediate between feldspar and alumina has been prepared. Examples of other suitable glasses which can be prepared include titania aluminosilicates with 10–25 mole % $TiO_2$, lead silicates containing 10–30 mole % PbO, and bismuth silicates containing 15–30 mole % $Bi_2O_3$. In such glasses, the index of refraction between matrix and filler is more closely matched than that of feldspar and alumina, but not as well as that between the glasses in Table 2 and alumina. Thus, to maximize translucency, it is preferable to use filler particles outside the wavelength of white light in this case.

TABLE 2

Example of glass compositions suitable for refractive index match with alumina filler particles. (mole percent)

1. $Na_2O(25)$—$TiO_2(35)$—$SiO_2(40)$
2. $K_2O(20)$—$TiO_2(45)$—$SiO_2(35)$
3. $Na_2O(13.55)$—$Bi_2O_3(52.87)$—$SiO_2(33.58)$
4. $Bi_2O_3(26.26)$—$SiO_2(73.75)$
5. $Na_2O(10.77)$—$PbO(33.05)$—$Sio_2(56.18)$
6. $Rb_2O(5.6)$—$PbO(23.7)$—$SiO_2(70.7)$
7. $BaO(25)$—$TiO_2(25)$—$SiO_2(50)$
8. $BaO(40)$—$Nb_2O_5(10)$—$SiO_2(50)$
9. $K_2O(19.2)$—$Nb_2O_5(23.1)$—$SiO_2(57.7)$
10. $Tl_2O(25.8)$—$B_2O_3(33.9)$—$SiO_2(40.3)$

EXAMPLE 6

A composite is prepared as in Examples 1–4 using a feldspar glass matrix except that in place of the alumina filler, another aluminosilicate- or silicate-based filler (e.g., leucite, silica, or β-cordierite or mullite) is used. The fillers are best dispersed at pH values away from their isoelectric points. Preferably, these fillers are used in a size range that is sufficiently small so as to eliminate or significantly reduce microcracking due to mismatches in thermal expansion coefficients. Where mismatches in filler-feldspar indices of refraction occur (e.g., with mullite), translucency can be improved by using filler particles outside the wavelength range of white light.

In the case of leucite, the filler particles preferably are less than 10 μm. Fumed silica is preferably used in a size range similar to that used for alumina in Example 1, while crystalline silica (e.g., in the form of quartz) is preferably used in a size range similar to that of leucite. Mullite may be used either in the size range for alumina or leucite.

EXAMPLE 7

A composite is prepared as in Examples 1-4 except that zirconium oxide or stabilized zirconium oxide is used in place of the alumina filler. The filler particles preferably have a unimodal size distribution centered around 0.01-0.05 μm.

EXAMPLE 8

The procedure of Examples 1-4 and 6-7 is followed except that a sol-gel route synthetic feldspar is used instead of natural feldspar.

Other embodiments are within the following claims.

I claim:

1. A dispersion-strengthened composite comprising a glass matrix reinforced with filler particles having a mean particle size centered around values in the range 0.01-0.7 micron, inclusive,
    said filler particles being chosen from the group consisting essentially of alumina, zirconia, silica, aluminosilicates, and silicates,
    the chemical composition of said composite being different from the chemical composition of the glass used to prepare said composite.

2. The composite of claim 1 wherein said matrix comprises a glass-forming oxide.

3. The composite of claim 2 wherein said glass-forming oxide comprises an aluminosilicate.

4. The composite of claim 2 wherein said glass-forming oxide comprises feldspar.

5. The composite of claim 1 wherein said matrix is prepared from a glass-forming powder having a mean particle size less than 10 μm.

6. The composite of claim 1 wherein said matrix is prepared from a narrow size distribution glass-forming powder having a mean particle size between 0.1 and 10 μm, inclusive.

7. The composite of claim 1 wherein said matrix is prepared from a classified glass-forming powder having a mean particle size between 0.1 and 10 μm, inclusive.

8. The composite of claim 1 wherein the particle size of said filler is outside the wavelength range of white light.

9. The composite of claim 1 wherein said filler is a narrow size distribution filler having a mean particle size between 0.1 and 0.7 μm, inclusive.

10. The composite of claim 1 wherein said filler is a classified filler having a mean particle size between 0.1 and 0.7 μm, inclusive.

11. The composite of claim 1 wherein said filler is a monodisperse filler having a mean particle size between 0.1 and 0.7 μm, inclusive.

12. The composite of claim 1 wherein the volume fraction of said filler in said composite is between 0.05 and 0.95, inclusive.

13. The composite of claim 1 wherein the volume fraction of said filler in said composite is between 0.10 and 0.60, inclusive.

14. The composite of claim 1 wherein said filler is a crystalline filler.

15. The composite of claim 1 wherein said filler is silica, alumina, mullite, zirconia, or β-cordierite, or leucite, or a combination thereof.

16. The composite of claim 1 wherein said glass matrix is formed from a feldspar powder having a mean particle size less than 10 μm, and said filler is alumina having a mean particle size outside the wavelength range of white light.

17. The composite of claim 1 wherein said composite is a sintered composite.

18. The composite of claim 17 wherein the light transmission through a one millimeter thickness of said composite is at least 10%.

19. The composite of claim 17 wherein the density of said composite is at least 90% of the theoretical density.

20. The composite of claim 17 wherein the fracture strength of said composite is at least 15,000 psi.

21. The composite of claims 1 or 17 wherein said composite is in the form of a machinable block.

* * * * *